United States Patent [19]

Suzuki et al.

[11] 4,065,639

[45] Dec. 27, 1977

[54] SYNCHRONOUS TRANSMISSION CONTROL SYSTEM

[75] Inventors: Seigo Suzuki, Yokohama; Seiji Eguchi, Kawasaki, both of Japan

[73] Assignee: Tokyo Shibaura Electric Co., Ltd., Tokyo, Japan

[21] Appl. No.: 732,701

[22] Filed: Oct. 15, 1976

[30] Foreign Application Priority Data

Oct. 15, 1975    Japan ................... 50-124147

[51] Int. Cl.² .............................................. H04L 7/00
[52] U.S. Cl. .................................................. 178/69.1
[58] Field of Search ................... 178/69.1; 179/15 BS; 328/155; 360/51

[56]    References Cited

U.S. PATENT DOCUMENTS

| | | | |
|---|---|---|---|
| 3,431,559 | 3/1969 | Webb | 340/172.5 |
| 3,493,935 | 2/1970 | Questa | 340/172.5 |
| 3,571,801 | 3/1971 | Coolidge | 360/51 X |
| 3,593,314 | 7/1971 | Moll | 364/200 |
| 3,766,316 | 10/1973 | Hoffman et al. | 178/69.1 |

*Primary Examiner*—Robert L. Richardson
*Attorney, Agent, or Firm*—Finnegan, Henderson, Farabow & Garrett

[57] ABSTRACT

A synchronous transmission control system is provided which comprises a first-in/first-out stack storing plural kinds of synchronous pattern signals, a comparator for comparing the synchronous pattern signals with the synchronous pattern signals delivered from a transmitting side, and a controller for switching the data flow in the stack in response to the output of the comparator, in which the comparison of the respective synchronous pattern signals stored in the stack with the synchronous pattern signals delivered from the transmitting side is carried out in the comparator, and, if the comparison shows coincidence between them, the data transmitted from the transmitting side is permitted to enter the receiving side through the stack, with an assumption that synchronization is established between the transmitting and receiving slides, while, if the comparison shows disagreement between them, a synchronous error control is executed.

3 Claims, 2 Drawing Figures

SYNCHRONOUS TRANSMISSION CONTROL SYSTEM

BACKGROUND OF THE INVENTION

The present invention relates to a synchronous transmission control system for synchronously transmitting data between transmitting and receiving sides and, more particularly, a synchronous transmission control system for data transmission between data processors such as minicomputers or microcomputers.

A synchronous transmission control system commonly used in the field of data communication is operated in such a way that a predetermined synchronous pattern signal is transmitted $n$ times in succession from the transmission side to the receiving side and, upon reception of the synchronous pattern signal, the receiving side takes a synchronization with the synchronous pattern signal and, after the synchronization is completed, the receiving side receives successively the data delivered from the transmission side. One form of the synchronous pattern signals is comprised of a succession of frame pattern signals each consisting of 8 bits or 16 bits. More particularly, in such a data transmission, the receiving side converts the serial data delivered from the transmitting side into the parallel data through the shift register included in the receiving side. In the receiving side, the parallel data converted is successively compared with the synchronous pattern signals which has been predetermined in relation with the time point of data transmission and stored in the synchronous register, the comparison being made by the comparator. When the successive comparison shows coincidence between the respective data and the synchronous pattern signals, the pattern data to be inputted to the shift register from the time of the coincidence is treated as the information data and thus loaded into the data register, with an assumption that the synchronization is established between the transmitting and receiving sides. The data register outputs the information data in parallel fashion.

In the synchronous transmission control system as mentioned above, the synchronous pattern signal is constructed by a single kind of codes so that the synchronization is relatively easily done. However, in case where the synchronous signal is constructed by grouping a plurality of specified pattern codes in sequential fashion, the frame of the synchronous pattern results in an elongation. Therefore, the synchronous pattern signal consisting of many kinds of synchronous pattern codes is unsuitable for the synchronous transmission control system above mentioned. If it should be applied for the synchronous transmission control system, the system constructed is considerably complicated and its manufacturing cost becomes high.

SUMMARY OF THE INVENTION

Accordingly, an object of the present invention is to provide a synchronous transmission control system which easily takes a synchronization with the synchronous pattern signal with a complex pattern sequence and assures a correct data transmission between the transmitting and receiving sides.

The present invention may be briefly summarized as involving a synchronous transmitting control system synchronously transmitting data between the transmitting and receiving sides, comprising: a first-in/first-out (FIFO) stack for storing plural kinds of synchronous pattern signals; means successively comparing the respective synchronous pattern signals with the synchronous pattern signals transmitted from the transmitting side in a pregiven timing; means for detecting the results of the comparison by the comparing means; and means for switching the data flow in the stack in response to the output of the detecting means. With such an arrangement, if the comparison between those plural kinds of synchronous pattern signals shows coincidence between them, with an assumption that synchronization is established between the transmitting and receiving sides, the switching means switches the data flow in the stack to an input mode, and the data from the transmitting side is permitted to enter the receiving side through stack, while, if the comparison shows disagreement between them, the synchronization between the transmitting and receiving sides fails to be taken and a synchronous error control is executed in order to establish a resynchronization between the transmitting and receiving sides.

DESCRIPTION OF THE PREFERRED EMBODIMENT

Figure 1:
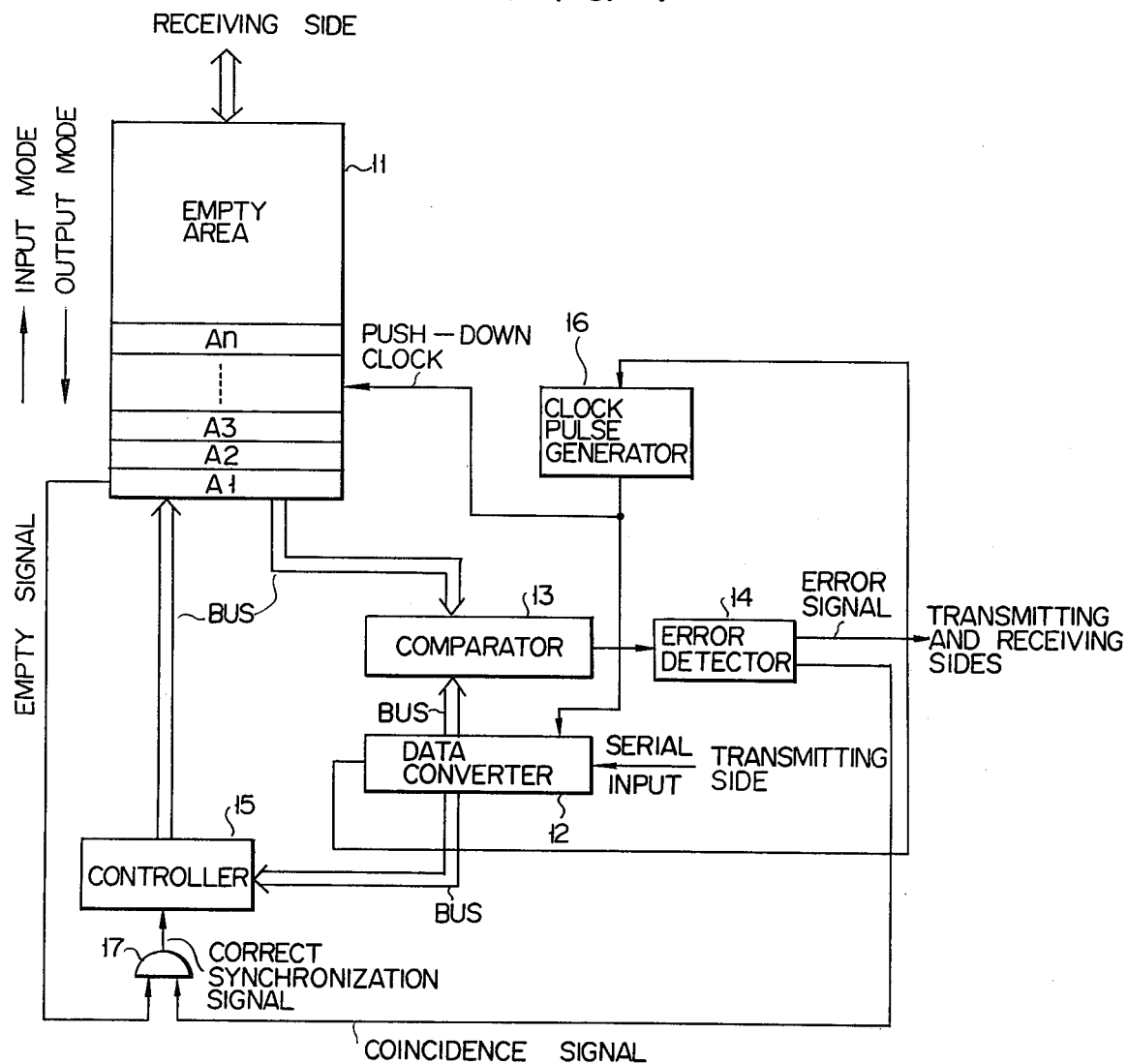
FIG. 1 is a block diagram of an embodiment of a synchronous transmission control system according to the present invention.

Referring now to FIG. 1, there is in a block form shown an embodiment of a synchronous transmission control system according to the invention. The synchronous transmission control system of the embodiment to be described is used for data-transmission between a data processor such a minocomputer or a microcomputer and a processing device such as an input/output device or a terminal device.

In the FIG. 1, reference numeral 11 designates first-in/first-out stack (hereinafter referred to as FIFO stack). The FIFO stack may be comprised of a couple of FIFO stacks of one-way data flow type: One permits data to flow in a direction; the other permits data to flow in the reverse direction. Alternatively, it may be a single FIFO stack with a bidirectional data flow. The FIFO stack serves to temporarily store the data transmitting between the transmitting and receiving sides. The data converter 12 is a serial-parallel converter for converting to a parallel data from the serial data including the synchronizing pattern signal followed by serial data transferred from a device (disk) of the transmitting side. The data converter 12 can easily be constructed with a shift-register. A comparator designated by reference numeral 13 compares the parallel data from the shift register 12 with the synchronizing pattern signal stored in the FIFO stack 11. The comparator may be of an ordinary word-organized type and easily constructed by using well known techniques. An error detector 14 for detecting the result of comparison in the comparator 13, produces a signal representing "correct synchronization" or "erroneous synchronization." The detector 14 may be constructed, for example, by simple flip-flops. A known control unit 15 is comprised of a circuit capable of switching the direction of the data flow in the stack 11, in response to the output of the error detector 14. A clock pulse generator 16 generates a series of timing pulses for operation of the comparator 13, and generates push-down clock signals at an interval of one word. In response to the clock signal, the synchronizing pattern of one word is stored in the FIFO stack 11 every time one word of the serial data from the transmitting side is inputted to the shift register 12. The push-down clock signal also is delivered to the shift register 12 to time the comparing operation.

Figure 2:
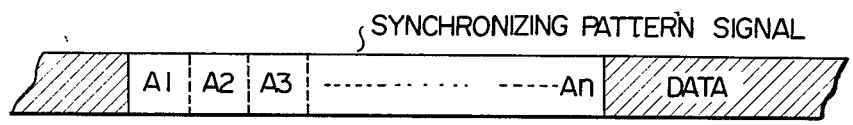
FIG. 2 diagrammatically shows a frame structure employed in the synchronous transmission control system of the invention, the frame including synchronous pattern signals each consisting of plural kinds of synchronous pattern data, and the information data.

Assume now that a n-word synchronizing pattern signal consisting of synchronizing pattern data, Al to An, each corresponding to one word is stored in the stacking fashion, as shown in FIG. 2, in the FIFO stack 13. Incidentally, the synchronizing pattern signal is formatted in the transmitting side (not shown), for example, a computer. The stacking fashion is easily obtained by using the FIFO stack as the input-output device and through the program of the computer.

FIG. 2 shows a frame structure with a synchronizing pattern signal followed by information data which is delivered from the transmitting side when the data transmission is performed between the transmitting and receiving sides. While the serial synchronizing pattern data of Al to An constituting the synchronizing pattern signal are sequentially fed to the shift register 12. When the synchronizing pattern data is inputted one word, e.g. the first synchronizing pattern data Al is inputted, the clock pulse generator 16 generates a push-down clock signal. The push-down clock signal pushes down the synchronizing pattern data by one word in the FIFO stack 11. Upon the pushing down, the Al data is guided from the stack 11 to the comparator 13 via a bus. On the other hand, the serial data received in the shift register 12 is timed by the push-down clock signal to be fed to the comparator 13. In the comparator, the data from the shift register 12 is compared with the Al data from the stack 11. When both the data coincide to each other, the error detector produces no output. In this manner, every time one word of the serial data is inputted into the shift register 12, the synchronizing pattern data Al to An are sequentially pushed down one by one and the data Al to An are compared with the contents of the shift register 12 in the order of Al to An in accordance with a predetermined timing. If there is produced no disagreement in the sequential comparing operation from the pattern data Al to An, the error detector 14 produces a coincidence signal by each word which in turn is applied to one of the input terminals of an AND gate 17. After the synchronizing pattern data An in the FIFO stack 11 is pushed down, the stack 11 becomes empty. Because the stack 11 have stored only the pattern data Al to An. The instance that the FIFO stack is empty, the stack 11 produces an empty signal which is in turn fed to the other input terminal of the AND gate 17. It is to be noted that the FIFO stack 11 is so designed that when the stack 11 is empty, it produces the empty signal. Upon receipt of the empty signal, the AND gate 17 is enabled to produce a correct synchronization signal. In other words, when the stack 11 is empty, if the error flag representing pattern is not hoisted or does not appear, there is established a perfect synchronization between the transmitting and receiving sides.

When it is desired to load the data sent from the transmitting side directly to FIFO stack 11, the output (correct synchronization signal) of the AND gate 17 is directly fed to the control unit 15 for controlling it. In response to the output of the AND gate 17, the control unit 15 switches the FIFO stack 11 from the output mode to the input mode. That is, the control unit 15 changes the direction of the data flow in the FIFO stack 11. The instance that the operation mode of the FIFO stack 11 is switched, the information transmitted from the transmitting side is processed as the data, and the data inputted through the shift register 12 is fed each word to the lower stage of the FIFO stack 11 under the control of the control unit 15. The result is the storage of the data in the stack 11. The data stored is then transmitted to the receiving side.

When comparing of the pattern data Al to An with the contents of the shift register 12 is under progression, if disagreement therebetween occurs, for example, at the time of the pattern data A3, the error detector 14 produces a disagreement error signal of logical level "1." At the same time, the coincidence signal at the output of the detector 14 becomes logical "0." As the disagreement error signal is produced, the comparing operation ceases and the asynchronous condition between the receiving and transmitting sides is imparted to the transmitting side, causing the data transmission to stop. At the same time, the asynchronous condition also is imparted to the receiving side of computer. An error signal representative of the asynchronous condition interrupts the computer of the receiving side which in turn refreshes the synchronous pattern data Al to An to the FIFO stack. It is noted that, at this time, the FIFO stack 11 has been changed to the output mode by the controller 15. Then, after the synchronization between the transmitting and receiving sides is corrected again and the data transmission restarts.

The synchronous transmission control system according to the invention thus ensures the synchronization between the transmitting and receiving sides by using plural kinds of synchronous pattern signals, and prevents the synchronous error such as the synchronous pattern error. Accordingly, the synchronous transmission system of the invention is effective when it is applied for the data transmission system permitting the transmission of the data having a frame construction including the synchronizing frame consisting of a predetermined number of words, followed by the data frame. This is because there is eliminated a failure of the data seizure at the initial stage. The synchronous transmission system of the invention is most effective for the interface of the disk memory or the like.

This invention is not restricted to the above-mentioned embodiments and various changes and modifications can be made without departing from the spirit and scope of the invention.

What we claim is:

1. a synchronous transmission system for synchronously transmitting data between transmitting and receiving sides, comprising:
   a first-in/first-out stack for storing plural kinds of synchronous pattern signals;
   means for successively comparing the synchronous pattern signals stored in said stack with the synchronous pattern signals transmitted from the transmitting side, respectively, in a predetermined timing;
   means for detecting the result of the comparison of said comparison means; and
   means for switching the direction of the data flow in said stack in response to the output of said detecting means.

2. A synchronous transmission system according to claim 1, further comprising:
   means for converting serial data to parallel data; and
   means for generating timing signals executing the comparison of said synchronizing pattern signals with the data sent from the transmitting side;
   wherein, every time said converting means receives a predetermined number of bits of the serial data delivered from the transmitting side, said comparing means sequentially compares the synchronous pattern signals stored in said stack with the parallel data converted by said converting means.

3. A synchronous transmission system according to claim 1, wherein, when the synchronous pattern signals stored in said stack is compared with the synchronous pattern signal transmitted from the transmitting side, if the former signals are all coincident with the latter ones, said converting means converts the direction of the data flow in said stack to the input modal direction, with an assumption that the synchronization between the transmitting and receiving sides is established, the data delivered from the transmitting side is permitted to enter the receiving side through said stack, while, if disagreement is found in said comparison, a synchronous error control is executed in order to establish a resynchronization between the transmitting and receiving sides.

* * * * *